United States Patent [19]

Childers et al.

[11] 4,258,144

[45] Mar. 24, 1981

[54] POLYPHENYLENE ETHER BLENDS

[75] Inventors: Clifford W. Childers; Raymond F. Uber, both of Bartlesville, Okla.

[73] Assignee: Phillips Petroleum Company, Bartlesville, Okla.

[21] Appl. No.: 96,351

[22] Filed: Nov. 21, 1979

[51] Int. Cl.³ .............................................. C09F 0/00
[52] U.S. Cl. ...................... 525/91; 525/412; 525/415
[58] Field of Search ...................... 525/91, 412, 415

[56] References Cited

U.S. PATENT DOCUMENTS

| | | | |
|---|---|---|---|
| 3,379,792 | 4/1968 | Finholt | 260/857 |
| 3,383,340 | 5/1968 | MacCallum | 260/3 |
| 3,383,435 | 5/1968 | Cizek | 260/874 |
| 3,557,252 | 1/1971 | Hsieh | 525/91 |
| 3,649,716 | 3/1972 | Childers | 525/91 |
| 3,652,720 | 3/1972 | Wright | 525/415 |
| 3,660,531 | 5/1972 | Lauchlan | 260/876 B |
| 3,666,701 | 5/1972 | Marrs | 525/91 |
| 3,764,639 | 10/1973 | Hsieh | 525/412 |
| 3,789,084 | 1/1974 | Childers | 525/415 |
| 3,792,121 | 2/1974 | Abolins | 260/874 |
| 3,792,123 | 2/1974 | Abolins | 260/876 R |
| 3,920,770 | 11/1975 | Nakashio | 260/897 R |
| 3,933,941 | 1/1976 | Yonemitsu | 260/873 |
| 3,943,191 | 3/1976 | Cooper | 260/876 R |
| 3,963,804 | 6/1976 | Yonemitsu | 260/873 |

*Primary Examiner*—Paul Lieberman

[57] ABSTRACT

Blends of polyphenylene oxide or styrene resin-modified polyphenylene oxide, lactone block copolymers and, optionally, polar resins exhibiting improved impact strength as compared with polyphenylene oxide resin with no additive.

21 Claims, No Drawings

POLYPHENYLENE ETHER BLENDS

FIELD OF THE INVENTION

This invention relates to improved polyphenylene ether resin compositions modified by a polymer of a conjugated diene. In another aspect, this invention relates to polyphenylene oxide compositions containing a copolymer of a lactone, a conjugated diene and/or a monovinylarene. In accordance with a further aspect, this invention relates to polyphenylene oxide compositions containing a copolymer of a lactone, a conjugated diene and/or a monovinylarene and a styrene resin. In accordance with a further aspect, this invention relates to modified compositions as set forth above further containing a polar resin.

BACKGROUND

The polyphenylene ether resins are a family of engineering thermoplastics that are well known to the polymer art. These polymers may be made by a variety of catalytic and non-catalytic processes from the corresponding phenols or reactive derivatives thereof. By way of illustration, certain of the polyphenylene ethers are disclosed in Hay, U.S. Pat. Nos. 3,306,874 and 3,306,875, and in Stamatoff, U.S. Pat. Nos. 3,257,357 and 3,257,358. In the Hay patents, the polyphenylene ethers are prepared by an oxidative coupling reaction comprising passing an oxygen-containing gas through a reaction solution of a phenol and a metalamine complex catalyst.

U.S. Pat. No. 3,356,761 discloses such polyphenylene oxides which are dissolved in styrene monomer and the styrene monomer subsequently polymerized into polystyrene to produce a mixture of polyphenylene oxide and polystyrene.

U.S. Pat. Nos. 3,373,226 and 3,383,435 disclose mixtures of polyphenylene oxide and a styrene resin.

U.S. Pat. Nos. 3,660,531 and 3,920,770 disclose polyphenylene oxide, or styrene resin modified-polyphenylene oxide, and a rubbery polymer, such as, for example, a butadiene-styrene block copolymer, said blends having unexpected thermoplastic properties.

In certain applications there is need for a polyphenylene oxide having improved adhesion to polar surfaces or to paints. Furthermore, it is often desired to have improved compatibility of polyphenylene oxide with other polar resins, or to improve the compatibility of the polyphenylene oxide with a rubbery polymer. These and other desirable properties can be achieved by blending with the polyphenylene oxide a polymer which contains at least one block of polymerized lactone.

Accordingly, an object of this invention is to provide a thermoplastic blend composition having improved thermoplastic properties, such as tensile strength and impact resistance.

Another object of this invention is to provide a polyphenylene ether thermoplastic composition of improved properties useful as an engineering plastic.

A further object of this invention is to provide a thermoplastic polyphenylene oxide resin composition having improved thermoplastic properties such as tensile strength and impact resistance without sacrificing the desirable properties of unmodified polyphenylene oxide resins.

Other objects, aspects, as well as the several advantages of this invention will become apparent to one skilled in the art upon the study of this specification and the appended claims.

STATEMENT OF THE INVENTION

According to the invention, there is provided a polymeric blend comprising (1) a polyphenylene oxide, alone or in combination with a styrene resin, and (2) a copolymer of a lactone, a conjugated diene, and/or a monovinylarene.

In another embodiment of the invention, polymeric blends exhibiting improved physical properties are prepared comprising (1) a polyphenylene oxide, (2) a styrene resin and (3) a copolymer of a lactone, a conjugated diene, and/or a monovinylarene.

In a further embodiment, thermoplastic compositions are provided comprising the above-modified polyphenylene oxide which, additionally, contains at least one polar resin.

In one particularly preferred embodiment, thermoplastic compositions having improved properties are provided comprising (1) poly(2,6-dimethyl-1,4-phenylene oxide), (2) polystyrene and (3) a styrene-butadiene-ε-caprolactone block terpolymer.

Blends having the polyphenylene oxide resin as the major component exhibit unexpected thermoplastic properties, such as tensile strength and impact resistance, without sacrificing the desirable properties of the unmodified polyphenylene oxide resin. However, when a rubbery lactone copolymer is the major component, the blends exhibit unexpected increases in properties such as abrasion and tear resistance, without sacrificing the desirable properties of unmofified rubbery lactone copolymers.

POLYPHENYLENE OXIDE

The polyphenylene oxides have the repeating structural unit of the general formula:

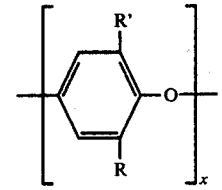

wherein the oxygen atom of one repeating unit is connected to the phenylene nucleus of the next repeating unit, R is a monovalent substituent selected from the group consisting of hydrogen, hydrocarbon radicals free of tertiary α-carbon atoms, halohydrocarbon radicals having at least two carbon atoms between the halogen atom and phenyl nucleus and being free of a tertiary α-carbon atom, and halohydrocarbonoxy radicals having at least two carbon atoms between the halogen atom and phenyl nucleus and being free of a tertiary α-carbon atom; R' is the same as R and may additionally be a halogen; and x may represent any whole integer greater than 100.

Examples of polyphenylene oxides corresponding to the above formula can be found in the above-referenced patents of Hay and Stamatoff. Especially preferred is poly(2,6-dimethyl-1,4-phenylene oxide).

The polyphenylene oxides can be prepared in various ways. One method comprises oxidizing a phenol represented by the formula:

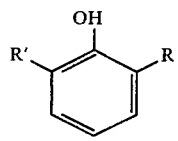

where R and R' have the same meanings given above. These phenols are oxidized by passing an oxygen-containing gas through the particular phenol in the presence of a catalyst system comprising a cuprous salt and a tertiary amine.

STYRENE RESIN

The styrene resin is one having at least 25 percent, by weight, polymer units derived from the compound having the formula

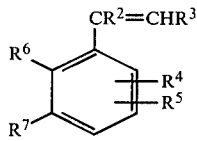

wherein $R^2$ and $R^3$ are selected from the group consisting of hydrogen and lower alkyl or alkenyl groups of from 1 to about 6 carbon atoms; $R^4$ and $R^5$ are selected from the group consisting of chloro, bromo, hydrogen, and lower alkyl groups of from 1 to about 6 carbon atoms; and $R^6$ and $R^7$ are selected from the group consisting of hydrogen and lower alkyl and alkenyl groups of from 1 to about 6 carbon atoms or $R^6$ and $R^7$ can be concatenated together with hydrocarbyl groups to form a naphthyl group.

The term "styrene resin" as used herein includes by way of example, homopolymers such as polystyrene, poly-α-methylstyrene, and poly(chlorostyrene), the modified polystyrenes such as rubber modified polystyrenes, and styrene-containing copolymers such as styrene-chlorostyrene copolymers, styrene-bromostyrene copolymers, styrene-acrylonitrile copolymers, styrene-butadiene copolymers, styrene-acrylonitrile-α-alkylstyrene copolymers, styrene-acrylonitrile-butadiene copolymers, and styrene-maleic anhydride copolymers. In addition, other suitable polymers include graft copolymers of styrene or α-methylstyrene polymerized on a polybutadiene or a butadiene-styrene copolymer, and graft copolymers of styrene or α-methylstyrene with vinyl monomers polymerized on a polybutadiene or a butadiene-styrene copolymer. The styrene resins described above may be prepared using polymerization methods described in such as *Billmeyer's Textbook of Polymer Science*, New York, Interscience Publishers, 1966.

The method of blending the polyphenylene oxide with the styrene resin, when a styrene resin modified-polyphenylene oxide is to be used in the invention composition, is not critical and does not constitute a part of this invention. The preferred method comprises blending the two polymers in powder or granular form, extruding the blend, chopping into pellets and re-extruding.

The polyphenylene oxides and the styrene resins are combinable with each other in all proportions. Consequently, compositions comprising from 1 to 99 percent, by weight, polyphenylene oxide and from 99 to 1 percent, by weight, styrene resin are included within the scope of the invention. In general, compositions containing from 40 to 85 percent polyphenylene oxide and from 60 to 15 percent styrene resin exhibit the best overall combination of properties and these compositions are preferred.

Suitable commercially available styrene resin-modified polyphenylene oxide resins are sold by General Electric under the trademark "Noryl."

LACTONE COPOLYMERS

The lactone block copolymers suitable for use in the composition of the invention are copolymers of a lactone, a conjugated diene, and/or a monovinylarene. Organolithium compounds are used as polymerization initiators. When the lactone copolymer of the invention is prepared using an active hydrogen-containing terminating agent, such as an acid or water, the lactone copolymer can be represented in its simplest form by the formula $A\text{-}(D)_y$ where A and D are polymer segments and y is an integer from 1 to about 4. When a monolithium initiator is used, the lactone copolymers can be represented at least in part by the formula A-D. While the formula A-D will form the basis for the description of other polymeric structures which can arise during polymerization, it should be understood that the following discussion also applies to copolymers prepared using multichelic initiators, i.e., for polymers wherein Y is 2 to about 4. In these formulas, A is a polymer segment comprising one or more polymer blocks (including homopolymer, random, and random-tapered blocks) of one or more conjugated dienes and/or one or more monovinylarenes, and D is a polymer segment comprising one or more polymer blocks of one or more lactones. When the A segment comprises a copolymer of conjugated dienes and monovinylarenes, the conjugated diene to monovinylarene weight ratio can range from about 99:1 to about 1:99. It will be recognized by those skilled in the art that when a mono- or dilithium initiator is employed, segment A will have a linear structure, and when a tri- or tetralithium initiator is employed, A will be branched, and the branches can have attached terminal polymer segments D. Furthermore, segment A will contain the residue of the organolithium initiator which is employed.

Following the formation of segment A, the lactone or mixture of lactones can be added directly to the polymerization mixture containing the preformed living polymer A-Li to give a living polymer which may have the structure A-D-Li, or, the lactone or mixture of lactones can be added after the living polymer is reacted with a capping agent such as an oxirane, aldehyde, epoxyaldehyde, polyaldehyde, ketone or epoxyketone, as described in U.S. Pat. No. 3,585,257 and U.S. Pat. No. 3,639,519, the disclosures of which are hereby incorporated by reference. When a capping agent is employed, the resulting polymer will contain a residue of the capping agent used.

It is currently believed that if the capping agent used is a coupling agent for the preformed A-Li polymer, as is the case, for example, for a compound having two or more oxirane groups, a polyaldehyde or an epoxyketone, or if no capping agent is added before the lactone (which itself can act as a coupling agent) is added directly to the preformed, non-capped living polymer, there may result a living polymer having the formula $(A)_nZ(Li)_n$, where A is as described previously, Z is the residue from one molecule of the capping-coupling agent or one molecule of the lactone monomer, and n is an integer having a maximum value equal to the number of living polymer segments A which can combine with the lactone monomer or the chosen capping-coupling agent. When Z is derived from the lactone monomer, n will have a maximum value of 2. The living polymer $(A)_nZ(Li)_n$ can initiate the polymerization of lactone monomer to give a branched polymer having up to n polylactone branches, i.e., $(A)_nZ(DLi)_m(Li)_{n-m}$, where D is block polylactone as described previously and m is a positive integer from 1 to and including n. After termination with an active hydrogen-containing terminating agent, such as an acid, an alcohol, or water, the resulting polymer can be represented by the formula $(A)_nZ(D)_m(H)_{n-m}$. It will be understood by one skilled in the art that, while not being shown, D will have a terminal hydrogen atom resulting from the reaction of $(DLi)_m$ with the active hydrogen-containing terminating agent, while the $(H)_{n-m}$ as shown above is connected directly to Z. There is also the possibility that a small amount of lactone homopolymer may be formed during polymerization as a result of base-catalyzed chain scission of A-D or $(A)_nZ(D)_m(H)_{n-m}$. Thus, the polymerized lactone composition may consist of one or more polymers of the structures A-D, $(A)_nZ(D)_m(H)_{n-m}$, and D.

As used in this application, the formula $A—D)_y$ is intended to encompass copolymers in which some coupling of the type described above has taken place.

In addition and importantly, the living polymers A-D-Li, and $(A)_nZ(DLi)_m(Li)_{n-m}$, as described previously, may be terminated with a coupling agent which can react with two or more of the above lithium containing polymers to give a highly branched polymer matrix. These polymers are not easily represented by a single generic formula, and although not falling within the strictest interpretation of $A-(D)_y$, these highly branched, coupled lactone copolymers are meant to be included, and presently represent the preferred lactone copolymer for use in the composition of this invention. Non-limiting examples of types of compounds which can serve as coupling agents include the active halogen containing compounds, such as, for example, phenyltrichlorosilane, tetrachlorosilane, α, α'-dichloro-paraxylene, and the like. Presently preferred for the compositions of this invention are lactone polymers which are branched as a result of coupling first by ε-caprolactone monomer and further with phenyltrichlorosilane.

It is essential that the conjugated diene monomer and/or the monovinylarene monomer be polymerized first because the polymer-Li structure, or the polymer-O-Li structure of the capped or coupled conjugated diene block, monovinylarene block, or conjugated diene-monovinylarene block, is believed to serve as the catalyst for the polymerization of the lactone monomer. If the lactone monomer is polymerized first, the lactone polymer-O-Li structure does not provide a reactive site for the subsequent polymerization of the conjugated diene or monovinylarene, and the block copolymer cannot be formed.

The block copolymers of this invention can also be prepared in a multi-step process in which a conjugated diene, a monovinylarene, or a mixture of conjugated diene and monovinylarene, is polymerized to essentially quantitative conversion using the lithium-containing initiator. Each succeeding step can then involve the addition of a different conjugated diene or monovinylarene, or mixtures of these, which is polymerized to essentially quantitative conversion so that a block copolymer having two or more blocks is formed before the lactone is added. The addition and polymerization of a lactone, mixture of lactones, or successive increments of different lactones are the final steps prior to termination in the multi-step polymerization process. It is essential in this process also that the conjugated dienes and monovinylarenes be polymerized first for the reason discussed above.

The copolymers of a lactone, a conjugated diene, and/or a monovinylarene, which are suitable for the compositions of this invention are preferably prepared using a recipe in which the lactone or mixture of lactones constitutes about 4 to 90 weight percent of the total monomers, preferably about 8 to 50 weight percent. It is estimated that, using the preferred recipe, the weight percent polymerized lactone in the block copolymer will range from about 2 to about 40 weight percent of the total polymerized monomers. When the A segment of the copolymer comprises a copolymer of conjugated dienes and monovinylarenes, the conjugated diene to monovinylarene weight ratio preferably ranges from about 99:1 to about 50:50. The molecular weight of the lactone copolymers used in the composition of the invention, calculated on the basis of millimoles of initiator per 100 g of total monomer charge, should be broadly from about 5,000 to 1,000,000, preferably 20,000 to 500,000, and more preferably 35,000 to 150,000.

Conjugated dienes containing 4 to about 12 carbon atoms per molecule and monovinylarenes containing 8 to about 12 carbon atoms per molecule can be used for the preparation of the polymerized lactone compositions used in this invention. For example, suitable conjugated dienes include 1,3-butadiene, isoprene, piperylene, 6-phenyl-1,3-hexadiene, and mixtures of these. Examples of suitable monovinylarenes include styrene, α-methylstyrene, 4-methylstyrene, 4-isopropylstyrene, 2,4-dimethylstyrene, 1-vinylnaphthalene, 2-vinylnaphthalene, and mixtures of these.

Lactone monomers which can be employed to prepare the lactone polymers for use in this invention can be represented by the formula

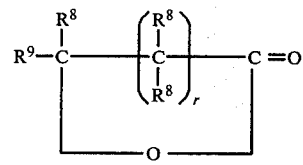

in which each $R^8$ is selected independently from hydrogen, alkyl, cycloalkyl, alkenyl, cycloalkenyl and aryl, and combinations thereof such as alkaryl and aralkyl; $R^9$ is selected from $R^8$, hydrogen, and a radical of the formula

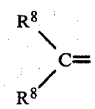

(when $R^9$ is the specified radical, no $R^8$ is attached to the carbon atom to which the radical is attached); the total number of carbon atoms in all the $R^8$ and $R^9$ substituents is within the range 0 to about 12; and r is 1, 3 or 4. Examples of lactones which can be used include beta-propiolactone, delta-valerolactone, epsilon-caprolactone, and lactones corresponding to the following acids: 2-methyl-3-hydroxypropionic acid, 3-hydroxynonanoic acid, 2-dodecyl-3-hydroxypropionic acid, 2-(1-naphthyl)-3-hydroxypropionic acid, 2-butyl-3-cyclohexyl-3-hydroxypropionic acid, 3-hydroxypentadecanoic acid, 2-(2-methylcyclopentyl)-3-hydroxypropionic acid, 2-o-tolyl-3-hydroxypropionic acid, 3-benzyl-3-hydroxypropionic acid, 2,2-dimethyl-3-hydroxypropionic acid, 2-methyl-5-hydroxyvaleric acid, 3-cyclohexyl-5-hydroxyvaleric acid, 4-phenyl-5-hydroxyvaleric acid, 2-heptyl-4-cyclopentyl-5-hydroxyvaleric acid, 2-methyl-3-phenyl-5-hydroxyvaleric acid, 3-(2-cyclohexylethyl)-5-hydroxyvaleric acid, 2-(2-phenylethyl)-4-propyl-5-hydroxyvaleric acid, 4-benzyl-5-hydroxyvaleric acid, 3-ethyl-5-isopropyl-6-hydroxycaproic acid, 2-cyclopentyl-4-hexyl-6-hydroxycaproic acid, 3-phenyl-6-hydroxycaproic acid, 3-(3,5-diethylcyclohexyl)-5-ethyl-6-hydroxycaproic acid, 4-(3-phenylpropyl)-6-hydroxycaproic acid, 2-benzyl-5-isobutyl-6-hydroxycaproic acid, 2,2,4-trimethyl-3-hydroxy-3-pentenoic acid, 2-phenyl-6-hydroxy-6-octenoic acid, and 2,2-dipropenyl-5-hydroxy-5-heptenoic acid. Mixtures of lactones can be employed.

The initiator used for the preparation of the lactone copolymers can be any lithium-containing polymerization initiator suitable for conjugated diene and for monovinylarene polymerization. The preferred initiators are those which correspond to the general formula $R^{10}(Li)_y$, in which $R^{10}$ is a hydrocarbon radical selected from the group consisting of aliphatic, cycloaliphatic, and aromatic radicals and combinations thereof, any y, as described previously, is an integer from 1 to about 4, inclusive. The $R^{10}$ group has a valence equal to y and preferably contains from 1 to about 20 carbon atoms, although it is possible to use high molecular weight compounds. Examples of suitable lithium-containing compounds within the scope of the above formula include methyllithium, isopropyllithium, n-butyllithium, tert-octyllithium, n-decyllithium, phenyllithium, 1-naphthyllithium, 4-butylphenyllithium, p-tolyllithium, 4-phenylbutyllithium, cyclohexyllithium, 4-butycyclohexyllithium, 4-cyclohexylbutyllithium, dilithiomethane, 1,4-dilithiobutane, 1,10-dilithiodecane, 1,20-dilithioeicosane, 1,4-dilithioeicosane, 1,4-dilithiocyclohexane, 1,4-dilithio-2-butene, 1,8-dilithio-3-descene, 1,4-dilithiobenzene, 1,5-dilithioanthracene, 1,2-dilithio-1,8-diphenyloctane, 1,3,5-trilithiopentane, 1,5,15-trilithioeicosane, 1,3,5-trilithiocyclohexane, 1,2,5-trilithionaphthalene, 1,3,5-trilithioanthracene, 1,3,5,8-tetralithiodecane, 1,5,10,20-tetralithioeicosane, 1,2,3,5-tetralithiocyclohexane, and 1,2,3,5-tetralithio-4-hexylanthracene. Other suitable initiators include reaction products between the compounds of the formula $R^{10}(Li)_y$ as disclosed above and one of a divinylaromatic or a trivinylaromatic compound containing 1 or 2 benzene rings or alkyl substituted benzene rings, the total of the alkyl substituents on any di- or trivinylaromatic compound not exceeding about 12 carbon atoms. Examples of suitable vinylaromatic compounds for reaction with the organolithium initiator include 1,3-divinylbenzene, 1,3,5-trivinylnaphthalene, and 4,4'-divinylbiphenyl.

In the preparation of the block copolymers of the invention having more than two separate polymer segments (a copolymer of the form $A\text{-}(D)_y$, where y=2 to about 4, and A and D are as defined previously), those lithium initiators which contain more than one active lithium atom per molecule are suitable. These initiators provide a central polymer segment of the conjugated diene and/or monovinylarene having attached to each of the terminal ends of the polymer segment an active Li atom. Initiators such as that formed by reacting lithium with methylnaphthalene and isoprene and solubilizing the reaction product with butadiene (LIMI-B) and catalysts such as a lithium-stilbene adduct are suitable, as well as those multilithio-containing compounds mentioned previously.

The initiator level for the polymerization can vary widely but is generally in the range of from about 0.1 to about 20 gram millimoles per 100 grams of the total monomers to be polymerized, i.e., all the conjugated diene, monovinylarene, and lactone monomers. The initiator level is generally not changed when the conjugated dienes and monovinylarenes have been polymerized to the desired extent and the lactone or lactones are added for polymerization. Thus, the initiator level for the polymerization of the conjugated diene and monovinylarene is generally the level for the entire polymerization process. Generally, the amount of initiator or initiators used in making the block copolymer of the invention will be that which is sufficient to effect the polymerization of substantially all monomers charged.

The polymerization reaction can be carried out in the presence of a diluent. Suitable diluents include, for example, paraffins, cycloparaffins, and aromatic hydrocarbons, each having from 4 to 10 carbon atoms per molecule, and mixtures thereof.

Various substances are known to be detrimental to the initiator and the living polymer of the invention. These detrimental substances include carbon dioxide, oxygen and water. It is highly desirable, therefore, that the reactants, the polymerization apparatus, and the polymerization reaction mixture be substantially free of these materials as well as any other materials which can deactivate any reactive species present in the process. Any diluent used should be free of impurities such as water, oxygen and carbon dioxide, and air and moisture should be removed from the polymerization reaction vessel.

The polymerization temperature for preparation of the A segment of the lactone block copolymers is in the range of about 0° C. to about 200° C., preferably 40° C. to about 125° C. The capping and/or coupling agent, if used, can be added at the polymerization temperature used for the A segment. The D segment (the polylactone segment) is polymerized at a temperature of about −20° C. to about 100° C., prferably about 0° C. to 70° C. For convenience, the pressure is maintained at a level sufficient to keep the polymerization reaction mixture substantially in the liquid phase. The time for polymerization of the monomers of each block of segment A can be from about 1 minute to about 100 hours, and the time for polymerization of the monomers of each block of segment D can be from about 1 minute to about 100 hours.

It is important that the combination of polymerization time and temperature for segment D be chosen so that conversion of monomer to polymer is essentially quantitative at the end of the chosen polymerization time. This is important because of the tendency of polylactones to undergo base-catalyzed degradation. In the presence of a base, polylactones or copolymers containing blocks of polylactones can undergo random chain scission to yield lactone oligomers or homopolymer. In the lactone polymerization process, a base is present throughout in the form of the organolithium initiator or the living polymer, which may have terminal —CH$_2$Li or —CH$_2$—O—Li groups. Because the degradation reactions must compete with the polymerization reaction for available lithium compound, and since polymerization kinetics are favored, degradation does not occur to a large extent until polymerization is complete. If polymerization is terminated before or immediately following quantitative conversion of lactone monomer to polymer, polylactone degradation is minimized.

Polymerization termination can be effected as described earlier using such as an active halogen containing compound, or alternatively by adding water, an aqueous solution of a mineral acid, or a carboxylic acid to the polymerization mixture which, prior to termination, contains a polymer of the form A-(-D-Li)$_y$. The mineral acids and lower carboxylic acids are typically added as dilute aqueous solutions, for example, as a 0.1 N solution, whereas the higher molecular weight, solid carboxylic acids are typically added without dilution to the polymer cement.

Suitable mineral acids include but are not limited to hydrochloric acid, sulfuric acid and phosphoric acid. The carboxylic acids are the aliphatic, alicyclic, aromatic, and heterocyclic di- and higher acids, and substituted derivatives thereof. Preferred carboxylic acids are the monocarboxylic acids having from about 2 to about 20 carbon atoms per molecule, such as acetic acid, benzoic acid, capric acid, lauric acid, and stearic acid.

Preferably, the amount of acid or water to be added is such that at least one equivalent weight of acid or water is added for each equivalent weight of organolithium initiator used to initiate the polymerization. It is within the scope of the invention to add excess acid or water although the amount added will not normally exceed about 5 equivalents by weight of acid per equivalent of organo-lithium initiator used.

It is currently believed that these specific active hydrogen-containing agents do not promote chain scission because of the fact that lithium hydroxide, a product of termination using water, is soluble in water and is thus isolated from contact with the polymer, which is present in the hydrophobic organic phase, and that the lithium salt which is formed upon termination using a mineral acid or a carboxylic acid has a relatively low basicity. Termination of polylactone polymerization with an alcohol or a phenolic antioxidant in an alcohol can result in the presence of lithium alkoxide or lithium phenoxide or other substance which can induce chain scission and reduce the amount of polymerized lactone incorporated in the polymer.

As the point of quantitative conversion of lactone monomer to polymer cannot be determined by observation of the reaction mixture, this point must generally be determined for a given set of reaction conditions by determination of the percent conversion of all monomers to polymer and analysis of the resulting copolymer to determine the extent of incorporation and retention of the desired amount of lactone in the copolymer for a given lactone reaction time.

The termination step regardless of the type of terminating agent employed can be conducted at the same temperature as the lactone polymerization step. To minimize polylactone block degradation, all polymer lithium should be terminated within the shortest time possible after addition of the terminating agent. For this reason, it is desirable that good mixing of the reaction mixture be provided. The terminating agent can be added using any method taught in the art so long as it provides for quick addition of sufficient terminating agent to react with all of the polymer lithium in the polymerization reaction mixture.

Following termination of the polymerization reaction by the method described above, the copolymer can be isolated by conventional techniques such as coagulation with an excess of a non-solvent such as isopropyl alcohol or by steam stripping, followed by drying of the copolymer. Antioxidant can be added to the polymerization mixture after polymerization termination is complete and prior to polymer isolation and drying. Alternatively or in addition, the isolated and dried lactone block copolymer can be compounded in any conventional manner with antioxidants as well as other conventional rubber additives such as fillers, reinforcing agents, extenders, plasticizers, pigments, curing and vulcanizing agents, processing aids, retarders, antiozonants, inhibitors, UV stabilizers, dispersing agents, and lubricants.

BLEND COMPOSITIONS

The weight ratio of the polyphenylene oxide, alone or in combination with a styrene resin, to the lactone copolymer in the polymer blends of this invention can range from 99:1 to 5:95. If a composition having high impact strength is desired, the polyphenylene oxide portion of the blend is normally the major component. Likewise if improved compatibility of polyphenylene oxide with polar resins, or better adhesion of polyphenylene oxide to polar surfaces or paints is desired, the polyphenylene oxide portion is normally the major component. However, if a rubbery material with improved tear and abrasion resistance is desired, a rubbery lactone copolymer will normally be the major component.

In preferred embodiments of the invention, the amounts of polyphenylene oxide present in the blend will range from about 30 to about 75 weight percent and the amounts of the styrene resin will range from about 15 to about 50 weight percent. The amounts of lactone modifying copolymer present in the blends will range from about 10 to about 25 weight percent.

The blend of a polyphenylene oxide, alone or in combination with a styrene resin, and a copolymer of a lactone, a conjugated diene, and/or a monovinylarene may be further blended with polar resins, such as for example, poly(vinyl chloride), polycarbonates, polyamides, polyesters, acrylic polymers, acrylonitrile-butadiene-styrene terpolymers, styrene-acrylonitrile copolymers, styrene-maleic anhydride copolymers, and the like, and mixtures thereof. These polar polymers can be the same or different from the styrene resin, when said styrene resin is a polar polymer, which may be present as the modifying polymer in the polyphenylene oxide which comprises the basic blend of this invention. The amounts of polar resins present in the blended compositions of the invention can range from 0 up to about 50 weight percent of the total blend.

The mixtures of this invention may contain certain other additives to plasticize, extend, reinforce, fill, lubricate, prevent oxidation, flame retard, dye, pigment, etc., the mixtures. Such additives are well-known in the art and may be incorporated without departing from the scope of the invention.

BLENDING METHODS

To prepare the blends of this invention, the polyphenylene oxide alone or in combination with a styrene resin, and the copolymer of a lactone, a conjugated diene, and/or a monovinylarene, and any other additional polymers or additives, may be mechanically blended together in the desired proportions with the aid of any suitable mixing device conveniently used for mixing rubbers or plastics, such as a differential roll mill, a Banbury mixer, an extruder, or a Brabender Plasti-Corder. In order to facilitate thorough mixing of the polymers and to develop the desired improved combination of physical properties, the mechanical blending is carried out at sufficiently high temperatures to soften the polymers so that they are thoroughly dispersed and intermingled with each other. The mixing temperature will in general vary with the composition of the lactone copolymer and the polyphenylene oxide resin. Usually the polyphenylene oxide, which is the higher softening material, will govern the mixing temperature selected. Mixing is continued until a uniform blend is obtained.

Alternately the polyphenylene oxide resin and the lactone copolymer may be solution blended by a method such as is described in U.S. Pat. No. 3,639,508.

EXAMPLE I

This example illustrates the preparation of a styrene-butadiene-ε-caprolactone copolymer suitable for blending with a polyphenylene oxide resin to give a polymeric composition of this invention.

The polymer was prepared according to Recipe 1 in two jacketed, stirred, stainless steel reactors connected in series, the first reactor having a capacity of 302.8 liters (80 gal.), and the second reactor having a capacity of 946.3 liters (250 gal).

RECIPE I

| | |
|---|---|
| Step I | |
| Cyclohexane, parts by weight | 800 |
| Styrene, parts by weight | 25 |
| n-Butyllithium, mhm[a] | 2.4 |
| Tetrahydrofuran, parts by weight | 0.1 |
| Polymerization temperature, °C. | 52→60[b] |
| Polymerization time, minutes | 10 |
| Step II | |
| 1,3-Butadiene, parts by weight | 50 |
| Polymerization temperature, °C. | 60→84[c] |
| Polymerization time, minutes | 35 |
| Step III | |
| ε-caprolactone, parts by weight | 0.5 |
| Polymerization temperature, °C. | 84 |
| Polymerization time, minutes | 5 |
| Step IV | |
| Transferred to second reactor and cooled | |
| Temperature, °C. | 84→30 |
| Time, minutes | about 35 |
| Step V | |
| ε-Caprolactone, parts by weight | 24.5 |
| Polymerization temperature, °C. | 30 |
| Polymerization time, minutes | 35 |
| Step VI | |
| Phenyltrichlorosilane, mhm | 0.76 |
| Reaction temperature, °C. | 30 |
| Reaction time, minutes | 5 |

[a]mhm = Gram millimoles per 100 grams of total monomers.
[b]Polymerization initiated at 52° C. and polymerization temperature peaked at 60° C.
[c]1,3-Butadiene added to polymerization reaction mixture at 60° C. and polymerization temperature peaked at 84° C.

Following completion of Step II, a small amount of ε-caprolactone was added to couple the living polymer having a polybutadienyllithium terminal group. This coupled living polymer (some uncoupled living polymer may also be present) was then transferred to a cooled second reactor and the reaction mixture cooled before addition and polymerization of the ε-caprolactone as branches on the coupled living polymer in Step III. Following completion of Step V, the living polymer having polycaprolactonyllithium terminal group was terminated with phenyltrichlorosilane. One part by weight of 2,2'-methylenebis(4-methyl-6-t-butylphenol) antioxidant dissolved in cyclohexane was added to the polymerization mixture prior to recovery of the lactone terpolymer by steam stripping.

The physical properties of the recovered styrene-butadiene-ε-caprolactone block terpolymer are shown in Table I.

TABLE I

| Physical Properties of Styrene-Butadiene-ε-Caprolactone Coupled Terpolymer | |
|---|---|
| Molecular Weight, $M_w$[a] | 170,000 |
| Molecular weight, $M_n$[a] | 101,000 |
| Heterogeniety index, $M_w/M_n$ | 1.68 |
| Inherent viscosity[b] | 1.09 |
| Gel, weight percent[c] | 0 |
| Total Styrene, weight percent[d] | 27.9 |

[a]Molecular weights were determined from gel permeation chromatography curves and intrinsic viscosities by a procedure described by G. Kraus and C. J. Stacy, J. Poly. Sci. A-2 10, 657 (1972), and G. Kraus and C. J. Stacy, J. Poly. Sci. Symposium No. 43,329 (1973).
[b]Inherent viscosity was determined according to a procedure given in U.S. Pat. 3,278,508, column 20, Note a with the modification that the solution was not filtered through a sulfur absorption tube but rather through a fritted glass filter stick of Grade C porosity and pressured directly into the viscometer.
[c]Gel determined according to procedure described in U.S. Pat. 3,278,508, column 20, Note b.
[d]Total styrene determined by ultraviolet absorption spectroscopy.

EXAMPLE II

This example illustrates the good tensile strength and impact strength of a blend of poly(2,6-dimethyl-1,4-phenylene oxide), polystyrene, and a styrene-butadiene-ε-caprolactone block terpolymer.

Forty parts of poly(2,6-dimethyl-1,4-phenylene oxide) having a molecular weight of about 20,000 and forty parts of polystyrene (Cosden 500, Cosden Oil and Chemical Company) were mixed in a C. W. Brabender Plasti-Corder by first charging the poly(2,6-dimethyl-1,4-phenylene oxide) and softening at 290° C., and then charging the polystyrene and mixing these two polymers for five minutes. Twenty parts of the styrene-butadiene-ε-caprolactone terpolymer prepared in Example I was then added and the blend mixed for an additional five minutes at 290° C. After removing the molten blended polymeric composition from the Plasti-Corder, and allowing it to cool and solidify, it was ground to a coarse powder and then compression molded in a slab mold at 240 MPa pressure at a temperature of 290° C. The molded slab was sawed into strips suitable for measuring physical properties. As controls, two blends were prepared in a similar manner, the first control blend consisting of a 50:50 mixture of poly(2,6-dimethyl-1,4-phenylene oxide):polystyrene, and the second control blend being similar to the invention blend with the exception that the styrene-butadiene-ε-caprolactone terpolymer was replaced with a 70/30 butadiene-styrene radial block copolymer having $M_2/M_n$ of about 150,000/120,000.

Physical properties of the invention blend and the two controls are shown in Table II.

TABLE II

Physical Properties of a Blend of Poly(2,6-dimethyl-1,4-phenylene Oxide), Polystyrene, and Styrene-Butadiene-ε-Caprolactone Terpolymer

| Blend No. | Composition, Weight % | | | | Tensile Strength, MPa[e] | Elongation, percent[e] | Flexural Modulus, MPa[f] | Izod Impact, J/m[g] | Hardness, Shore D[h] |
|---|---|---|---|---|---|---|---|---|---|
| | PPO[a] | PS[b] | Bd-Sty[c] | Sty-Bd-CL[d] | | | | | |
| 1 (control) | 50 | 50 | — | — | 30.0 | 2.4 | 2640 | 23 | 74 |
| 2 (control) | 40 | 40 | 20 | — | 33.7 | 4.1 | 1740 | 54 | 80 |
| 3 | 40 | 40 | — | 20 | 37.5 | 5.4 | 1750 | 84 | 78 |

[a]Poly(2,6-dimethyl-1,4-phenylene oxide).
[b]Polystyrene (Cosden 500; Cosden Oil and Chemical Company).
[c]Solprene® 416. 70/30 Butadiene/styrene radial teleblock copolymer having number average molecular weight of about 150,000.
[d]Styrene-butadiene-ε-caprolactone block terpolymer prepared in Example I.
[e]ASTM D638-76.
[f]ASTM D790-71.
[g]ASTM D2560-73.
[h]ASTM D2240-75.

These data illustrate the improvement in tensile strength and impact strength which results form the addition of a styrene-butadiene-ε-caprolactone terpolymer to a mixture of poly(2,6-dimethyl-1,4-phenylene oxide) and polstyrene, and further illustrate that the styrene-butadiene-ε-caprolactone terpolymer causes a greater increase in these properties than does a butadiene-styrene radial teleblock copolymer which does not contain blocks of polymerized ε-caprolactone.

EXAMPLE III

This example illustrates the good impact strength of a blend of a polyphenylene oxide resin and a styrene-butadiene-ε-caprolactone block terpolymer.

A blend of a polyphenylene oxide resin (Noryl 731; General Electric) and the styrene-butadiene-ε-caprolactone block terpolymer described in Example I was prepared by feeding a mixture of the two dry polymers in the desired weight ratio to a 1½ inch (3.8 cm) diameter extruder employing a mixing screw and the polymer blend melt extruded at a melt temperature of 300° C. The extruded polymer strands were water quenched and chopped into pellets. Test specimens [1/16 inch (1.6 mm) thick dumbbell bars having a one inch (2.54 cm) gauge length] were prepared by injecting the molten polymer blends heated to 300° C. into a mold maintained at 66° C. Control blends consisting of polyphenylene oxide resin (Noryl 731) and a butadiene-styrene teleblock copolymer were extruded and molded in like manner. Test bars were also molded from polyphenylene oxide resin (Noryl 731) without added rubber as an additional control. Physical properties of the test bars prepared from the experimental blend and the controls are shown in Table III.

TABLE III

Physical Properties of Blend of Polyphenylene Oxide Resin and Styrene-Butadiene-ε-Caprolactone Terpolymer

| Blend No. | Composition, Weight % | | | Tensile Strength At Break, MPa[d] | Elongation percent[d] | Flexural Modulus, MPa[e] | Izod Impact, J/m[f] | | Hardness Shore D[g] |
|---|---|---|---|---|---|---|---|---|---|
| | Noryl 731[a] | Sty-Bd-CL[b] | Bd-Sty[c] | | | | Notched | Unnotched | |
| 4 (control) | 100 | — | — | 61.5 | 104 | 2370 | 73.7 | 617 | 86 |
| 5 | 90 | 10 | — | 52.9 | 95 | 1980 | 96.6 | 1070 | 83 |
| 6 | 90 | — | 10 | 50.5 | 79 | 1940 | 87.5 | 950 | 82 |
| 7 | 80 | 20 | — | 44.1 | 68 | 1690 | 115.0 | 1340 | 80 |
| 8 | 80 | — | 20 | 44.6 | 77 | 1670 | 91.8 | 918 | 80 |

[a]A styrene resin-modified poly(2,6-dimethyl-1,4-phenylene oxide) containing about 45–50 weight percent of the polyphenylene oxide (manufactured and sold by General Electric).
[b]Terpolymer prepared in Example I.
[c]Solprene® 416. 70/30 Butadiene-styrene radial teleblock copolymer having number average molecular weight of about 150,000.
[d]ASTM D638-76.
[e]ASTM D790-71.
[f]ASTM D256-73.
[g]ASTM D2240-75.

These data illustrate the improvement in impact strength of Noryl 731 which results from the addition of a styrene-butadiene-ε-caprolactone terpolymer, and further illustrate that the lactone copolymer causes a greater increase in impact strength than does a butadiene-styrene radial teleblock copolymer which does not contain blocks of polymerized ε-caprolactone.

EXAMPLE IV

This example illustrates blends of poly(2,6-dimethyl-1,4-phenylene oxide), polystyrene, styrene-butadiene-ε-caprolactone, and various polar resins, said blends having good physical properties.

The blends were prepared in a C. W. Brabender Plasti-Corder according to the procedure described in Example III with the modification that the polar resin was added to the molten composition in the Plasti-Corder immediately following the addition of the styrene-butadiene-ε-caprolactone block terpolymer, and the four polymer-blend mixed for 5 minutes prior to removing and cooling. Molding of test slabs was conducted at 290° C. as in Example III with the exception of the blend in which poly(vinyl chloride) was the additional polar resin, in which the test slab was molded at 260° C. Even at this lower temperature some decomposition occurred indicating an even lower molding temperature would be preferable. Table IV shows the physical properties of these four-way blends.

TABLE IV

Physical Properties of Blends of Poly (2,6-dimethyl-1,4-phenylene Oxide), Polystyrene, Styrene-Butadiene- ε-Caprolactone Block Terpolymer, and a Polar Resin

| Blend No. | Composition, weight % | | | | Tensile Strength, MPa$^d$ | Elongation percent$^d$ | Flexural Modulus, MPa$^e$ | Izod Impact, J/m$^f$ | Hardness Shore D$^g$ |
|---|---|---|---|---|---|---|---|---|---|
| | PPO$^a$ | PS$^b$ | Sty-Bd-CL$^c$ | Polar Resins | | | | | |
| 1 (control) | 50 | 50 | — | — | 30.0 | 2.4 | 2640 | 23 | 74 |
| 9 | 28 | 28 | 14 | 30 Nylon 6-6$^h$ | 42.5 | 4.8 | 2110 | 36 | 80 |
| 10 | 28 | 28 | 14 | 30 Polycarbonate$^i$ | 36.4 | 3.4 | 1920 | 18 | 81 |
| 11$^j$ | 28 | 28 | 14 | 30 PVC$^k$ | 17.1 | 2.5 | 1460 | 21 | 82 |
| 12 | 28 | 28 | 14 | 30 ABS$^l$ | 31.4 | 3.0 | 1940 | 18 | 78 |

$^a$Poly(2,6-dimethyl-1,4-phenylene oxide).
$^b$Polystyrene (Cosden 500; Cosden Oil and Chemical Company).
$^c$Terpolymer prepared in Example 1.
$^d$ASTM D638-76.
$^e$ASTM D790-71.
$^f$ASTM D256-73.
$^g$ASTM D2240-75.
$^h$Poly(hexamethyleneadipamide); Zytel 103 HSil; DuPont
$^i$Lexan 141; General Electric.
$^j$Properties are probably low due to some degradation which occurred during test specimen preparation.
$^k$Poly(vinyl chloride); Type 103 EP-576; B. F. Goodrich.
$^l$Acrylonitrile-butadiene-styrene copolymer, Cycolac DFA 1000R; Borg Warner.

These data illustrate that a polymeric composition of this invention, i.e., a blend of polyphenylene oxide, styrene resin, and lactone copolymer, can be further blended with various polar resins to give a four-way polymeric blend composition having good physical properties.

We claim:

1. A composition comprising
   (a) a polyphenylene ether resin, and
   (b) a block copolymer of the formula A(D)$_y$ wherein A is a polymer segment which comprises one or more polymer blocks formed at least in part from one or more conjugated diene monomers and/or one or more monovinylarene monomers, D is a polymer segment which comprises one or more polymer blocks formed from one or more lactone monomers, and y is 1, 2, 3 or 4.

2. The composition of claim 1 wherein the conjugated diene monomers are selected from the group of conjugated dienes having 4 to about 12, inclusive, carbon atoms per molecule, the monovinylarene monomers are selected from the group of monovinylarenes having 8 to about 12, inclusive, carbon atoms per molecule, and the lactone monomers are selected from the group of lactones represented by the formula $$R^9-\overset{R^8}{\underset{|}{C}}-\left[\overset{R^8}{\underset{\underset{R^8}{|}}{C}}\right]_r-C=O \quad \text{(with O closing the ring)}$$

wherein each $R^8$ is selected independently from the group consisting of hydrogen, alkyl, cycloalkyl, alkenyl, cycloalkenyl, aryl, alkaryl and aralkyl; $R^9$ is selected from the group consisting of $R^8$, hydrogen and a radical of the formula $$\underset{R^8}{\overset{R^8}{\diagdown}}C= \text{ and,}$$

when $R^9$ is the radical $$\underset{R^8}{\overset{R^8}{\diagdown}}C=,$$

no $R^8$ is attached to the carbon atom to which the radical is attached; r is 1, 3 or 4; and the total number of carbon atoms in all the $R^8$ and $R^9$ substituents does not exceed about 12.

3. The composition of claim 1 wherein D constitutes about 2 to about 40 weight percent of A plus D.

4. A composition according to claim 2 wherein said block copolymer consists essentially of two segments wherein one segment is a block of said conjugated diene and the other segment is a lactone polymer attached to one end of the block of said conjugated diene.

5. A composition according to claim 2 wherein said block copolymer consists essentially of two segments wherein one segment is a block of a said monovinylarene and the other segment is a lactone polymer attached to one end of the block of said monovinylarene.

6. A composition according to claim 2 wherein said block copolymer consists essentially of three segments, the first segment being a polymer of said monovinylarene monomer, sand having attached to one end thereof a second segment of a polymer of said conjugated diene, the polymer segment of said conjugated diene having also attached thereto a lactone polymer.

7. A composition according to claim 2 wherein said block copolymer consists essentially of two segments, the first segment being a copolymer of said conjugated diene and said monovinylarene, and the second being a lactone polymer attached to one end of said first segment.

8. The composition of claim 6 or 7 wherein the conjugated diene is 1,3-butadiene, the monovinylarene is styrene, and the lactone is ε-caprolactone.

9. A composition according to claim 1 further comprising (c) a styrene resin having at least 25 percent by weight polymer units derived from a compound having the formula

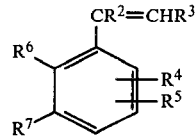

wherein $R^2$ and $R^3$ are selected from the group consisting of hydrogen and lower alkyl or alkenyl groups of from 1 to about 6 carbon atoms; $R^4$ and $R^5$ are selected from the group consisting of chloro, bromo, hydrogen, and lower alkyl groups of from 1 to about 6 carbon atoms; and $R^6$ and $R^7$ are selected from the group consisting of hydrogen and lower alkyl and alkenyl groups of from 1 to about 6 carbon atoms or $R^6$ and $R^7$ may be concatenated together with hydrocarbyl groups to form a naphthyl group.

10. A composition according to claim 9 wherein said styrene resin is polystyrene.

11. A composition according to claim 6 further comprising a styrene resin having at least 25 percent by weight polymer units derived from the compound having the formula

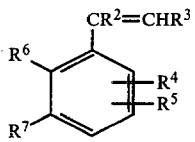

wherein $R^2$ and $R^3$ are selected from the group consisting of hydrogen and loweralkyl or alkenyl groups of from 1 to about 6 carbon atoms; $R^4$ and $R^5$ are selected from the group consisting of chloro, bromo, hydrogen, and lower alkyl groups of from 1 to about 6 carbon atoms; and $R^6$ and $R^7$ are selected from the group consisting of hydrogen and lower alkyl and alkenyl groups of from 1 to about 6 carbon atoms or $R^6$ and $R^7$ may be concatenated together with hydrocarbyl groups to form a naphthyl group.

12. A composition according to claim 11 wherein said styrene resin is polystyrene.

13. A composition according to claim 11 wherein
(a) is poly(2,6-dimethyl-1,4-phenylene oxide),
(b) is a block copolymer of 1,3-butadiene, styrene, and ε-caprolactone, and
(c) is polystyrene.

14. A composition according to claim 13 further comprising (d) a polyamide, a polycarbonate, poly(vinyl chloride), or an acrylonitrile-butadiene-styrene copolymer.

15. A composition according to claim 1 wherein said block copolymer further comprises the residue of a coupling agent.

16. A composition according to claim 15 wherein the coupling agent is phenyltrichlorosilane.

17. A composition formed from a process comprising the steps of
(a) providing a lithium-terminated polymer of the form $A(D\text{-}Li)_y$ wherein A is a polymer segment comprising one or more polymer blocks formed at least in part from one or more conjugated diene monomers, and/or one or more monovinylarene monomers, D is a polymer segment comprising one or more polymer blocks formed from one or more lactone monomers, and y is 1 to about 4,
(b) contacting the lithium-terminated polymer $A\text{-}D(Li)_y$ with a terminating agent selected from the active halogen-containing compounds, water, a mineral acid and a carboxylic acid, thus producing a block copolymer of the form $A\text{-}D)_y$, and
(c) mixing the polymer of step (b) with a polyphenylene oxide resin and, optionally, with a styrene resin in the desired proportions and under conditions which produce a blended composition having improved tensile and impact strengths.

18. The composition of claim 17 wherein the lithium-terminated polymer of the form $A\text{-}D(Li)_y$ is contacted with the terminating agent at or before substantially quantitative conversion of the lactone monomer to polymer.

19. A composition according to claim 17 wherein A is formed in part from one or more monivinylarene monomers.

20. A composition according to claim 19 wherein the product of step (b) is a block copolymer of 1,3-butadiene, styrene and ε-caprolactone and wherein said ε-caprolactone constitutes about 2 to about 40 wt. % of A plus D.

21. A composition according to claim 17 wherein the terminating agent in step (b) is phenyltrichlorosilane.

* * * * *